United States Patent Office 2,772,739
Patented Dec. 4, 1956

2,772,739

METHOD OF TEMPORARILY CLOSING PORTION OF WELL AND COMPOSITION THEREFOR

Arie Brakel, Maracaibo, Venezuela, and Norman Healey, St. Albans, England, assignors to Shell Development Company, New York, N. Y., a corporation of Delaware No Drawing. Application September 22, 1954,
Serial No. 457,786

Claims priority, application Netherlands
September 24, 1953

3 Claims. (Cl. 166—22)

This invention relates to a lightweight cement product or composition consisting principally of Portland cement together with a certain proportion of a lightweight material, and to the method of making such a cement product or composition.

An essential operation in oil well drilling operations is the use of a cement slurry to plug, either temporarily or permanently, a portion of the well, or for the purpose of cementing the well casing in the well borehole. In very deep wells of 10 to 20,000 feet, where it is necessary to pump the cementing material to a great depth, it is desirable to employ a cement composition having as light a weight as possible so as to maintain at a reasonable value the cement pumping capacity needed to place the cement at a proper location within the well borehole. Also by use of a lightweight cement slurry, the possibility of losing all or a portion of the slurry to a porous formation is minimized.

Thus, it is a primary object of the present invention to provide a cement composition of low specific gravity whereby well boreholes may be more readily cemented at great depths.

During other phases of well drilling operations, it is often necessary to temporarily seal off a portion of the borehole wall with cement, or to place a solid plug of cement temporarily at some level in the borehole. This necessity occurs, for example, when a fissure in an oil or gas bearing layer is temporarily shut off by means of cement or gypsum, or when a cementation operation has failed because the slurry has flowed away into the formation.

It is known to incorporate a porous rock material, for instance, tuff, in a cement slurry. It is not always possible, however, to add a material such as tuff to the cement slurry since this porous rock material cannot be readily disintegrated, as by acid, when it may be desired at a later time to remove the cement seal.

It is therefore a further object of the present invention to provide a lightweight cement composition incorporating particles of a material which may readily disintegrate when treated with certain weak acid solutions.

These and other objects of this invention will be understood from the following description.

Broadly, the present invention relates to a lightweight cement composition for use in drilling operations obtained by admixing with the cement quantities of a granulated expanded carbonate, particularly calcium carbonate, for example expanded limestone.

It is known to mix certain quantities of normal calcium carbonate in a cement slurry for various reasons, but cement compositions of this type have a considerably higher gravity and are not as readily acid-soluble as the cement composition of the present invention.

Porous lightweight particles used in accordance with the present invention have a relatively low apparent specific gravity and hence a large quantity thereof can be used in cement slurries without their settling out.

The particles of the expanded limestone to be used in cement compositions may be of any desired size, this size being limited mainly by the characteristics of the cementing equipment such as pipes and pumps used to force a cement slurry down the well. A portion of the expanded limestone particles may have a maximum in diameter of from ⅛ to ⅜ of an inch while other portions of the material may be made up of particles respectively smaller and larger in size. The porosity of the particles is preferably more than 30%.

When, after a well has been completed, or during well completion operations, it is desirable to remove a cement plug from a particular section of the borehole, a lightweight cement composition including a substantial portion of expanded limestone particles may be completely disintegrated and removed in a very short time by pumping or spotting a suitable volume of acid, for example, a 15% solution of hydrochloric acid (preferably inhibited) adjacent the cement plug and in contact therewith. Sulfuric acid can also be used. The term expanded limestone or expanded calcium carbonate as used herein refers to a solid material having a cellular or porous structure.

The maximum and minimum amounts of expanded limestone particles which may be added to cement compositions in accordance with the present invention depend on various factors such for example: (1) the maximum amount that can be added and still would permit the cement slurry to harden under the prevailing well conditions of temperature, pressure, etc., (2) the specific gravity of the slurry desired, depending on the height of the cement column to be placed, and (3) the rate of disintegration of the cement plug desired when the plug is treated with an acid solution. In general, the practical maximum quantity of expanded limestone to be added is about 60% or more by weight of the solid materials present: for example, 60% limestone and 40% cement. The minimum amount of expanded limestone which can be employed to obtain disintegration under acid treatment at a suitable rate is about 20% or less by weight.

A suitable process for preparing a porous solid substance which disintegrates in acid, and which dissolves to a large extent even in dilute acid, comprises admixing a predominant quantity of a preferably crushed carbonate, particularly calcium carbonate, for example, limestone, with a minor quantity of sodium silicate, preferably in the form of water glass, and subsequently heating the mixture. Preferably, a water glass solution is used which has a density of at least 1.6 so as to yield an expanded product of suitable hardness.

In the process by which limestone is expanded, the quantity of water glass is chosen so that the ratio of the limestone weight (measured in kilograms) to the water glass volume (measured in liters) lies between 1 and 3. The more water glass is used, the smaller the pores of the expanded product tend to become, while the pore distribution is more uniform. A suitable expanded product is obtained by heating the above mixture to a temperature ranging from 400° C. to 800° C. Normally, a temperature of about 500° C. is sufficient.

The porosity of the expanded limestone, prepared in accordance with this invention, may vary from 30% to 70% or more. This last value may further be increased by adding to the mixture of limestone and sodium silicate a surface-active substance such as "Teepol" (salts of secondary sulfuric acid alkyl esters).

Another method of preparing the present expanded carbonate comprises taking a starting material containing mixed crystals of calcium carbonate and magnesium carbonate, for example, dolomite, and heating this material, preferably in the presence of $CO_2$, to a temperature above the decomposition temperature of magnesium carbonate, but below the decomposition temperature of calcium carbonate. The resultant product exhibits so-called open porosity. However, it is also possible to prepare an expanded product having closed porosity by taking the above product exhibiting open porosity and treating it further with sodium silicate, for example, soaking it in a water glass solution. The mixture is then heated under conditions required for expanding limestone with sodium silicate. A porous solid substance exhibiting closed porosity is obtained, after crushing, which disintegrates in contact with a 15% hydrochloric acid solution. Closed porosity may also be obtained by treating the crushed porous material of the present invention with suitable plastic materials or natural or synthetic resins which tend to coat the outside of the porous material to close the pores without filling them.

*Example I*

A quantity of limestone was grounded and passed through an A. S. T. M. sieve No. 70. 25 grams of the limestone particles which had passed the sieve were mixed with 10 cubic centimeters of water glass (specific gravity 1.6) to form a slurry layer which was subsequently heated for three minutes at 500° C. in an oven. The thickness of the slurry layer was about 5 millimeters. After heating, the material formed a hard porous cake and its thickness was found to have doubled. This cake was crushed and was found to consist of a very porous material. The true specific gravity of the expanded material was 2.5, which indicated that the product had practically only open porosity. The apparent specific gravity was slightly higher than one. The porosity was approximately 65%.

The material underwent no change in boiling water. When treated with a 15% hydrochloric acid solution, the material completely disintegrated and about 80% of it was dissolved.

*Example II*

The expanded limestone obtained by the method described in Example I was crushed and sieved (50% by weight obtained between A. S. T. M. sieves Nos. 6 and 10; 50% by weight between the sieves No. 10 and No. 20). The material was then soaked in water glass having a specific gravity of 1.6 to permit water glass to enter the pores. The material was then heated for three minutes at 500° C. in an oven. After cooling, it was again crushed and sieved in the same manner indicated above.

With this material a cement slurry was prepared, equal weights of expanded limestone cement and water being mixed together to form a slurry. The specific gravity of the slurry was 1.36. The set cement rapidly disintegrated in 16% hydrochloric acid.

Equal weights of expanded limestone obtained by the method described in Example I was crushed and sieved (50% by weight obtained between A. S. T. M. sieves No. 6 and No. 10; 50% by weight between A. S. T. M. sieves No. 10 and No. 20), cement and water were mixed together to form a slurry weighing 1.6 kg. per cu. dm. A sample cube of the said cement incorporating porous limestone disintegrated at room temperature in 15% hydrochloric acid within 5 to 10 minutes. A similar cube of cement prepared without expanded limestone was not attacked at all in 10 minutes' time under the same conditions.

We claim as our invention:

1. A cement product consisting essentially of a hydraulic cement, and from 15 to 60% by weight of lightweight expanded limestone particles sufficient to make the cement product readily acid-soluble, said expanded limestone having at least 30% porosity.

2. In well drilling operations, the step of temporarily closing a portion of a well by forming therein a lightweight acid-soluble closure comprising a mixture of hydraulic cement and lightweight expanded limestone having at least a 30% porosity, allowing said mixture to set and form a closure and subsequently causing disintegration of said closure by subjecting the same to the action of acid to open the well.

3. In a method for temporarily closing and subsequently reopening a portion of a formation traversed by a well during drilling operations, the steps of placing adjacent the formation to be closed a lightweight acid-soluble closure comprising a mixture of hydraulic cement and from 15 to 60% by weight of the solids of an expanded calcium carbonate having at least 30% porosity, allowing said mixture to set and form a closure and subsequently causing disintegration of said mixture by subjecting the same to the action of acid.

References Cited in the file of this patent

UNITED STATES PATENTS

| | | |
|---|---|---|
| 2,193,807 | Dieterich | Mar. 19, 1940 |
| 2,695,669 | Sidwell | Nov. 30, 1954 |